United States Patent Office 3,250,775
Patented May 10, 1966

3,250,775
PROCESS FOR PREPARING BENZYLMERCAPTO PYRIMIDINES
Mervin E. Brokke, Richmond, Calif., assignor to Stauffer Chemical Company, New York, N.Y., a corporation of Delaware
No Drawing. Filed Feb. 6, 1963, Ser. No. 256,534
3 Claims. (Cl. 260—251)

This application is a continuation-in-part of application Serial No. 94,985, filed March 13, 1961, now abandoned.

This invention relates to a novel chemical process or method of synthesis. More particularly, the present invention relates to a new and novel synthesis of benzylmercaptopyrimidines in the presence of N,N-dimethylformamide.

The present invention results in the synthesis of compounds of the following structure:

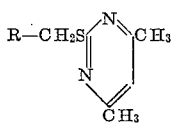

wherein R is selected from phenyl or a substituted phenyl, said substituents being selected from halogen and lower alkyl.

By the present invention, the desired product is synthesized by reacting in the presence of N,N-dimethylformamide the corresponding benzylthiopseudourea hydrohalide with 2,4-pentanedione, indicated as follows:

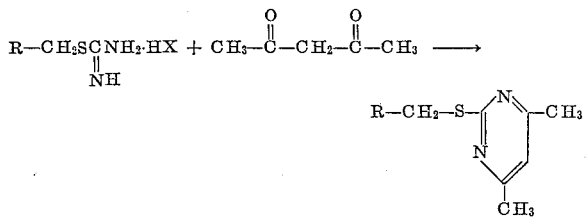

wherein R is selected from the group consisting of phenyl and substituted phenyls.

The compounds formed by the present invention are known compounds. However, the method of synthesis of the present invention is not taught or suggested by the prior art. British Patent No. 758,827 discloses the prior art method of synthesis in which a substituted pyrimidine-2-thiol is reacted wtih a benzyl halide in the presence of a base.

As mentioned previously, the present invention resides in the reaction of a benzyl-2-thiopseudourea-hydrohalide and 2,4-pentanedione in the presence of N,N-dimethylformamide to give the corresponding benzylmercapto-4,6-dimethylpyrimidines. In equation form the recation is as follows:

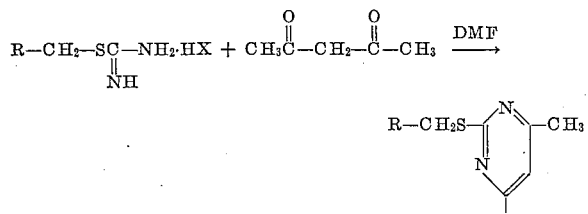

wherein R is selected from the group consisting of phenyl and substituted phenyls.

The use of N,N-dimethylformamide catalyzes the reaction of the present invention and substantial increases in yield are obtained using shortened reaction periods. The exact mechanism of the catalysis is not known, but the unexpected improved results are quite evident in the examples given later in the specification.

The isothiuronium salt or in other words, the thiopseudourea hydrohalide of the reaction described supra can be made by reacting a benzyl halide with thiourea. This reaction can be effected by use of any suitable solvent, such as isopropyl alcohol, N,N-dimethylformamide or the like, or by heating in an oil bath without solvent. The intermediate isothiuronium salt may be prepared separately and treated with 2,4-pentanedione, or it may be formed as described previously and the reaction mixture used directly without isolation to form the desired benzylmercapto-4,6-dimethylpyrimidine by reaction with 2,4-pentanedione in the presence of N,N-dimethylformamide.

The preferred method of carrying out the reaction of the present invention is to mix approximately equal molar amounts of the appropriate benzyl halide, thiourea, 2,4-pentanedione, and N,N-dimethylformamide and reflux the mixture until the reaction is completed. In actual practice, the reaction will take place at temperatures below the reflux temperature of the mixture (boiling point of DMF), but for economy reasons the reaction should take place at temperatures of at least 100° C. at atmospheric pressure.

Over-all, the reaction can be illustrated as follows:

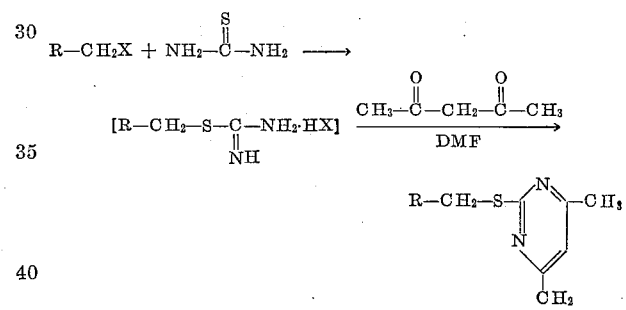

where X is a halogen and R is selected from the group consisting of phenyl and substituted phenyls.

The benzylmercapto-4,6-dimethylpyrimidines produced by the practice of the present invention are useful as miticides and herbicides.

The following examples will further illustrate the superiority of the method of present invention.

*Example 1.—2-benzylmercapto-4,6-dimethylpyrimidine*

A mixture of 40.5 g. (0.2 mole) 2-benzyl-2-thiopseudourea hydrochloride, 20.0 g. (0.2 mole) 2,4-pentanedione and 200 ml. isopropanol was refluxed with stirring for four hours. The hot reaction mixture was poured onto ice and water. The solid, which separated, was filtered and washed with water. After recrystallization from petroleum ether, B.P. 60–70° C., the white crystalline solid weighed 1 g. (2.2% yield) and melted at 62.0–63.5° C. A mixed melting point with an authentic sample showed no depression.

*Example 2.—2-benzylmercapto-4,6-dimethylpyrimidine*

Benzyl chloride (25.3 g., 0.2 mole) was added to thiourea (15.2 g., 0.2 mole) in 25 ml. N,N-dimethylformamide. This mixture was raised to the boiling point and 2,4-pentanedione (22 g., 0.22 mole) was added. The resulting solution was refluxed for one hour. It was then poured into water, and the solid, which separated, was collected and washed with water. The yield was 34.5 grams, 75%. After recrystallization from petroleum ether, B.P. 60–70° C., the melting point was 64.5–65° C.

A mixed melting point with an authentic sample showed no depression.

*Example 3.—2-(3,4-dichlorobenzylmercapto)-4,6-dimethylpyrimidine*

By a procedure analogous to Example 2, using thiourea (15.2 g., 0.2 mole), α,3,4-trichlorotoluene (39.1 g., 0.2 mole), 2,4-pentanedione (22 g., 0.22 mole) and N,N-dimethylformamide (90 g.), there was obtained 51 grams (85%) of solid product, which after recrystallization from isopropanol melted at 66–69° C. A mixed melting point with an authentic sample showed no depression.

*Example 4.—2-(4-methylbenzylmercapto)-4,6-dimethylpyrimidine*

By a procedure analogous to Example 2, using thiourea (7.6 g., 0.1 mole), α-chloro-p-xylene (12.9 g., 0.1 mole), 2,4-pentanedione (10.0 g., 0.1 mole) and N,N-dimethylformamide (8.0 g., 0.11 mole), there was obtained 17.2 g. solid (70.5%), which after recrystallization from petroleum ether, B.P. 60–70° C., melted at 56.5–58° C. A mixed melting point with an authentic sample showed no depression.

*Example 5.—2-(4-chlorobenzylmercapto)-4,6-dimethylpyrimidine*

By a procedure analogous to Example 2, using thiourea (7.6 g., 0.1 mole), α,p-dichlorotoluene (16.1 g., 0.1 mole), 2,4-pentanedione (10.0 g., 0.1 mole) and N,N-dimethylformamide (8.0 g., 0.1 mole), there was obtained 18.1 g. (68.5%) of a solid, which after recrystallization from isopropanol melted at 54–55° C. A mixed melting point with an authentic sample showed no depression.

*Example 6.—2-(4-methylbenzylmercapto)-4,6-dimethylpyrimidine*

α-Chloro-p-xylene (12.9 g., 0.1 mole) and thiourea (7.6 g., 0.1 mole) were mixed and heated under reflux for five minutes in an oil bath at 150° C. 2,4-pentanedione (10.0 g., 0.1 mole) was then added, and the resulting solution was heated under reflux with occasional shaking for 1 hour at a bath temperature of 150° C. The solution was then poured into 750 ml. ice and water. The solid, which separated, was collected and washed with water. The yield was 8.7 g., 35.5%. After recrystallization from isopropanol the melting point was 58–59° C. A mixed melting point with an authentic sample showed no depression.

*Example 7.—2-benzylmercapto-4,6-dimethylpyrimidine*

By a procedure analogous to Example 6, using benzyl chloride (12.7 g., 0.1 mole), thiourea (7.6 g., 0.1 mole) and 2,4-pentanedione (10.0 g., 0.1 mole), there was obtained 5.7 g. (24.8%) of a solid, which after recrystallization from isopropanol melted at 63–64° C. A mixed melting point with an authentic sample showed no depression.

*Example 8.—2-(4-chlorobenzylmercapto)-4,6-dimethylpyrimidine*

By a procedure analogous to Example 6, using α-p-dichlorotoluene (16.1 g., 0.1 mole), thiourea (7.6 g., 0.1 mole) and 2,4-pentanedione (10.0 g., 0.1 mole), there was obtained 7.0 g. (26.5%) of a solid which after recrystallization from isopropanol melted at 54–56° C. A mixed melting point with an authentic sample showed no depression.

We claim:
1. The method of making compounds of the formulae

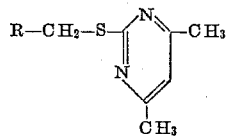

wherein R is selected from the group consisting of phenyl and substituted phenyls, said substituents being selected from halogen and lower alkyl, comprising reacting an isothiuronium salt of the formula

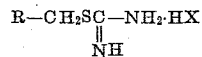

wherein R is selected from the group consisting of phenyl and substituted phenyls, said substituents being selected from halogen and lower alkyl, and X is a halogen, with 2,4-pentanedione in the presence of N,N-dimethylformamide.

2. The method of making compounds of the formulae

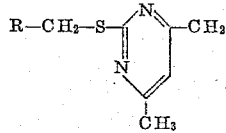

wherein R is selected from the group consisting of phenyl and substituted phenyls, said substituents being selected from halogen and lower alkyl, comprising reacting a compound of the formulae

wherein X is a halogen and R is selected from the group consisting of phenyl and substituted phenyls, said substituents being selected from halogen and lower alkyl, with thiourea and then adding 2,4-pentanedione and N,N-dimethylformamide to the reaction mixture to form the desired product.

3. The method of making compounds of the formulae

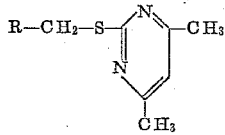

wherein R is selected from the group consisting of phenyl and substituted phenyl, said substituents being selected from halogen and lower alkyl, comprising reacting a compound of the formulae, $RCH_2X$, wherein X is a halogen and R is selected from the group consisting of phenyl and substituted phenyls, said substituents being selected from halogen and lower alkyl, with thiourea and 2,4-pentanedione in the presence of N,N-dimethylformamide.

References Cited by the Examiner

UNITED STATES PATENTS

| | | | |
|---|---|---|---|
| 2,839,446 | 6/1958 | Margot et al. | 260—251 |
| 2,890,224 | 6/1959 | Schneider | 260—564 |
| 2,945,038 | 7/1960 | Duschinsky et al. | 260—251 |

OTHER REFERENCES

Basterfield, J.: Canadian Research, vol. 1 (1929), pp. 258–91.

HENRY R. JILES, *Acting Primary Examiner.*

IRVIN MARCUS, WALTER A. MODANCE, *Examiners.*